United States Patent [19]  
Kurio

[11] 4,087,099  
[45] May 2, 1978

[54] OIL SEAL MEANS FOR ROTARY PISTON ENGINES
[75] Inventor: Noriyuki Kurio, Higashihiroshima, Japan
[73] Assignee: Toyo Kogyo Co., Ltd., Japan
[21] Appl. No.: 772,132
[22] Filed: Feb. 25, 1977
[30] Foreign Application Priority Data

| Mar. 1, 1976 | Japan | 51-22425 |
| Mar. 25, 1976 | Japan | 51-33374 |
| Apr. 9, 1976 | Japan | 51-44915[U] |

[51] Int. Cl.² ............................................. F16J 15/34
[52] U.S. Cl. .................................... 277/81 R; 277/92; 418/142
[58] Field of Search ............... 277/81 R, 88, 89, 92, 277/36, 38, 39, 40, 42, 81 P; 418/142

[56] References Cited  
U.S. PATENT DOCUMENTS

| 3,822,973 | 7/1974 | Prasse | 418/142 |
| 3,827,701 | 8/1974 | Sakawaki | 277/81 P |
| 3,884,602 | 5/1975 | Phillips | 418/142 |
| 3,909,015 | 9/1975 | Kasahara | 277/81 P |

FOREIGN PATENT DOCUMENTS 1,016,540   1/1966   United Kingdom ............... 277/81 P Primary Examiner—Herbert F. Ross  
Attorney, Agent, or Firm—Fleit & Jacobson

[57] ABSTRACT

In a rotary piston engine comprising a casing having a pair of opposed inner side surfaces, and a rotor disposed in the casing and having opposite side surfaces confronting with said inner side surfaces of the casing, an oil seal assembly is positioned in an annular seal groove formed in each side surface of the rotor. The seal assembly comprises a seal ring having an annular lip adapted to be brought into sealing sliding engagement with the inner side surface of the casing, a bellows type spring connected at one end with the seal ring and an annular member connected to the other end of the spring and seated in the seal groove. An auxiliary seal is positioned between the annular member and the wall of the seal groove.

9 Claims, 12 Drawing Figures

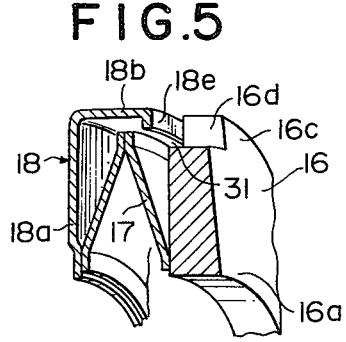
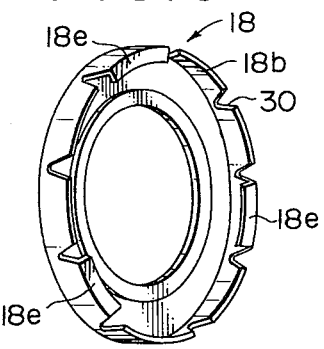
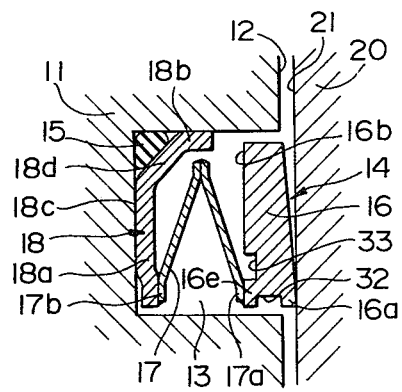
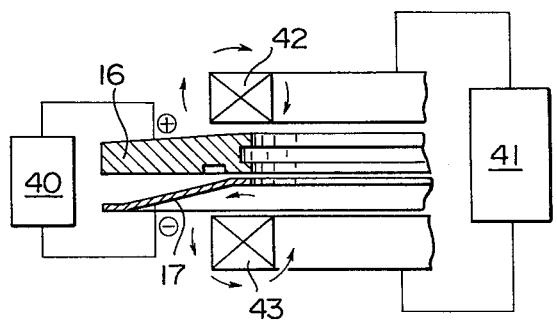
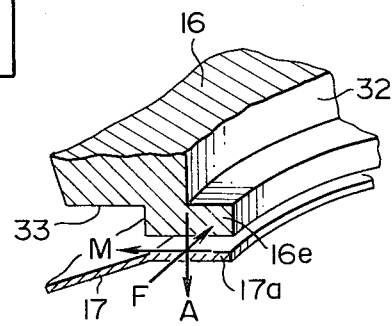

OIL SEAL MEANS FOR ROTARY PISTON ENGINES

The present invention relates to rotary piston engines and more particularly to oil seal means therefor.

Conventional rotary piston engines include a casing comprising a rotor housing and a pair of side housings secured to the opposite sides of the rotor housing to define a rotor cavity therein. A rotor is disposed in the cavity for rotation about its own axis and revolution about the axis of an output shaft. In order to ensure that lubricant oil is prevented from entering working chambers which are defined between the casing and the peripheral surface of the rotor, oil seal means is provided on each of the side surfaces of the rotor.

For the purpose, conventional rotary piston engines have a circular or annular sealing groove on each of the side surfaces thereof for accommodating an oil seal ring. The oil seal ring has a lip and usually inserted into the sealing groove with a corrugated spring behind the seal ring so that the lip on the seal ring is forced under the action of the spring into contact with the inner surface of the side housing. In this known arrangement, it is also necessary in order to prevent the lubricant oil from passing through the backside of the seal ring to provide an O-ring seal between the seal ring and the peripheral wall of the seal groove.

It has been experienced that in this type of oil seal means the O-ring seal is subjected to expansion during operation due to the heat and the effect of gasoline from the working chambers, with the result that the movement of the seal ring in the axial direction of the rotor is adversely restrained. Due to such restraint of the axial movement, the seal ring is often disabled to follow the changes in the gap between the side surface of the rotor and the inner surface of the side housing so that the oil sealing feature is broken or at least weakened.

In order to solve the above problem, proposals have already been made in various ways. For example, the British patent 1,016,540 discloses an oil seal assembly which comprises an oil seal ring, a spring in the form of a bellows having one end secured to the oil seal ring and an annular member or a ring which forces the other end of the bellows type spring into sealing contact with the outboard peripheral wall of the sealing ring groove. The proposed oil seal assembly is considered as being able to eliminate the aforementioned problems in the conventional oil seal means, however, it has been found that the arrangement provides further problems which must be solved to make the arrangement practically useful.

More particularly, in the arrangement as proposed by the British patent, the oil-tightness at the backside of the seal ring is maintained through the pressure contact between the outboard peripheral surface of the seal ring groove and the free end of the bellows type spring, so that it is required to have the co-operating groove wall surface and the free end of the bellows precisely finished. Since the bellows type spring must be designed so as to provide a biasing force of a limited value to the seal ring, the bellows must be formed of a very thin material. Therefore, it is practically very difficult to manufacture such bellows with a precise dimension. Further, problems have also been encountered in assembling the seal means into the seal groove in that even a very small misalignment between the seal and the seal groove has caused wrinkles in the free end of the bellows.

The present invention has therefore an object to provide oil seal means for rotary piston engines, which is easy to manufacture and can provide a reliable oil sealing property in use.

Another object of the present invention is to provide oil seal means for rotary piston engines which can effectively prevent lubricant oil from leaking along the backside of the seal ring while allowing substantially free movement of the seal ring in the direction of the axis of the rotor.

Still further object of the present invention is to provide reliable and durable oil seal means for rotary piston engines.

Yet another object of the present invention is to provide oil seal means for rotary piston engines, which does not include any part that requires precise manufacturing.

A further object of the present invention is to provide oil seal means for rotary piston engines, which is easy to assemble in the seal groove in the rotor.

According to the present invention, the above and other objects can be accomplished in rotary piston engines comprising a casing having a pair of opposed inner side surfaces, and a rotor disposed in the casing and having opposite side surfaces confronting with said inner side surfaces of the casing, by oil seal means adapted to be positioned in annular seal groove means defined in each of said side surfaces of the rotor by groove wall means, said oil seal means comprising seal ring means having lip means adapted to be brought into sliding engagement with the inner side surfaces of the casing, annular spring means in the form of bellows means having one end secured to the seal ring means, annular member means secured to the other end of the spring means and adapted to be seated in the seal groove means, and auxiliary seal means disposed in said seal groove means between said annular member means and said groove wall means. Auxiliary seal means may be seated in a further groove that may be provided in the wall surface, for example, in the bottom surface of the seal groove means. Alternatively, it may be positioned in a space specifically provided for the purpose between the annular member means and the wall surface of the seal groove means.

The bellows type spring means may be secured to the seal ring means and the annular member means by any suitable means, for example, adhesives, welding, brazing and the like. When a magnetically driven welding technique is to be employed for securing the spring to the seal ring, it is preferred to form one or more recesses in the seal ring so that the thermal capacity in the seal ring becomes compatible with that of the bellows type spring.

According to a further feature of the present invention, the annular member means has an edge spaced from but positioned beneath the seal ring, so that when the bellows is collapsed the seal ring engages the edge of the annular member means. This arrangement is considered as facilitating the assembling operation.

The above and other objects and features of the present invention will become apparent from the following descriptions of preferred embodiments taking reference to the accompanying drawings, in which:

FIG. 5 is a fragmentary perspective view showing the oil seal assembly in accordance with the embodiment shown in FIG. 4;

FIG. 6 is a perspective view showing the annular member used in the oil seal assembly shown in FIGS. 4 and 5;

FIG. 7 is a fragmentary sectional view showing a further embodiment of the present invention;

FIG. 8 is a diagrammatical view of the apparatus for welding the bellows type spring with the seal ring;

FIG. 9 is a fragmentary perspective view for explaining the welding operation in the apparatus shown in FIG. 8;

Figure 1:
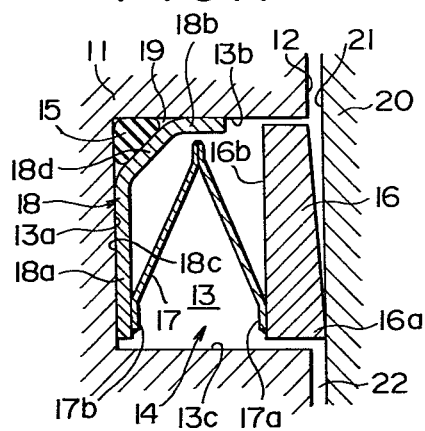
FIG. 1 is a fragmentary sectional view of a rotary piston engine showing the oil seal assembly in accordance with one embodiment of the present invention.
Figure 2:
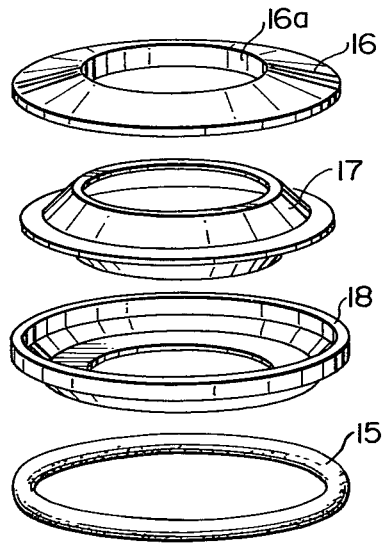
FIG. 2 is an exploded view of the oil seal assembly shown in FIG. 1.

Referring now to the drawings, particularly to FIGS. 1 and 2, there is shown an example of the oil seal assembly 14 which embodies the feature of the present invention. In FIG. 1, the rotary piston engine shown therein includes a rotor 11 and a casing 20. The rotor 11 has a side surface 12 confronting to an inner side surface 21 of the casing 20. The rotor 11 is formed with an annular seal groove 13 of rectangular cross-section opening to the side surface 12 for receiving the seal assembly 14. The groove 13 has a bottom 13a and radially outer and inner wall surfaces 13b and 13c.

As shown in FIG. 2, the seal assembly 14 comprises a seal ring 16, an annular spring 17 in the form of a bellows 17 and an annular member 18. The seal ring 16 is of trapezoidal cross-section having a lip 16a at a radially inner edge thereof. The seal ring 16 has a substantially flat surface 16b at the side opposite to the side where the lip 16a is formed and this side 16b will hereinafter be referred to as the back side.

The bellows type spring 17 is secured at one side 17a to the back side 16b of the seal ring 16 and at the other side 17b to the annular member 18 by suitable means such as welding, brazing, adhesives and the like. The annular member 18 is of a substantially L-shaped cross-sectional configuration having a flat bottom 18a and an upright peripheral wall portion 18b with an oblique corner wall portion 18d therebetween. The side 17b of the bellows 17 is secured to the radially inner portion of the flat bottom 18a. It should of course be noted that the portions 17a and 17b on the bellows 17 are secured to the seal ring 16 and the annular member 18 throughout their peripheral lengths.

As shown in FIG. 1, the bottom 18a of the annular member 18 has a back surface 18c which is seated on the bottom 13a of the seal groove 13 when the seal assembly 14 is placed in the groove 13. The peripheral wall portion 18b is placed under pressure contact due to its own resiliency with the outer peripheral wall 13b of the groove 13. In the embodiment, a space 19 is defined between the oblique corner portion 18d and the corner of the groove 13 and an auxiliary seal 15 is disposed in the space 19. It will be seen in FIG. 1 that the auxiliary seal 15 is subjected to a deformation under a pressure applied from the annular member 18 and the bottom and peripheral wall portions of the groove 13 to provide a reliable seal. The auxiliary seal 15 may be formed of asbestos or heat-resistant rubber material.

The arrangement is advantageous in that the auxiliary seal 15 is subjected to a substantially constant or stable pressure so that the life of the seal can be increased. Further, the bellows type spring 17 is always free to bias the seal ring 16 so that the lip 16a is always maintained in sliding contact with the inner side surface 21 of the casing 20.

Figure 3:
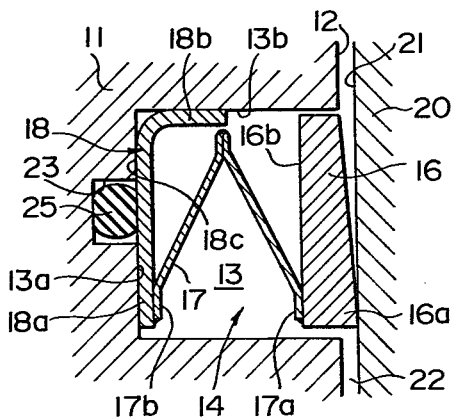
FIG. 3 is a fragmentary sectional view similar to FIG. 1 but showing another embodiment.

In the embodiment shown in FIG. 3, the seal assembly 14 is constructed in the similar manner as in the previously embodiment except the arrangement of the auxiliary seal. In the instant embodiment, the seal groove 13 is formed at its bottom 13a with a second groove 23 and an O-ring seal 25 is positioned in the second groove 23. The seal 25 is therefore subjected to a stable pressure applied from the back surface 18a of the annular member 18.

Figure 4:
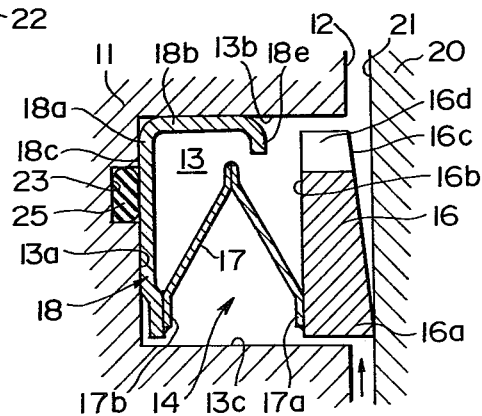
FIG. 4 is a fragmentary sectional view of the rotary piston engine in accordance with a further embodiment of the present invention.

Referring now to FIGS. 4 through 6, the seal assembly 14 shown therein has the similar configuration as in the previous embodiments so that corresponding parts are designated by the same reference numerals as in FIG. 3. In the embodiment, the upright peripheral wall portion 18b of the annular member 18 has a plurality of circumferentially spaced cutouts 30 as clearly shown in FIG. 6. This provides radial flexibility to the annular member 18 and facilitates assembling operation.

Further, the upright peripheral wall 18b of the member 18 is formed with radially inwardly extending lips 18e at circumferentially spaced portions. Further, the seal ring 16 has an outer peripheral portion 16c which overlies the lips 18e so that when the bellows 17 is collapsed the peripheral portion 16c is brought into abutting engagement with the lips 18e. The peripheral portion 16c on the seal ring 16 is also formed with a plurality of circumferentially spaced cutouts 16d at portions corresponding to the lips 18e. The radial length of the cutout 16d is greater than that of the lip 18e so that a clearance 31 is provided therebetween but the circumferential length of the cutout 16d is smaller than that of the lip 18e so that the peripheral portion 16c can engage the lip 18e without fail when the spring 17 is collapsed. It will be understood that the number and the configuration of the lips 18e and those of the cutouts 30 may be changed as desired.

The arrangement in this embodiment is advantageous in that the oil seal assembly 14 can be inserted into the groove 13 by simply applying a pressure to the seal ring 16. When such a pressure is applied to the seal ring 16, the spring 17 is collapsed until the peripheral portion 16c engages the lips 18e on the annular member 18 and the pressure is thereafter transmitted directly to the annular member 18. Thus, the seal assembly 14 can be inserted into the groove 13 until the bottom 18a of the annular member 18 is seated on the bottom 13a of the groove 13. Since the peripheral wall 18b is formed with the cutouts 30, it can be easily deflected radially inwardly during the assembling operation. However, it should be noted that the cutouts 30 may be omitted. In the operative position shown in FIG. 4, the lips 18e on the annular member 18 are spaced from the backside 16b of the seal ring 16 by a distance greater than the clearance between the surface 21 of the casing 20 and the side surface 12 of the rotor 11 so that the axial movement of the seal ring 16 is not disturbed by the annular member 18. When the seal assembly 14 is to be removed from the groove 13, a hooking tool may be inserted into the clearance 31 so that the lip 18e is engaged by the tool and pulled out of the groove 13.

Referring now to FIG. 7, there is shown a further embodiment of the present invention which includes a seal ring of modified configuration. In the embodiment, the seal ring 16 is formed with a recess 32 at the radially inward surface and also with a recess 33 at the back surface 16b. The recess 32 is effective to provide a resiliency to the lip 16a so that the lip 16a can follow the contour of the inner side surface 21 of the casing 20. Further, it will be noted that the recess 32 and 33 together form a thin annular lip 16e which is compatible in thermal capacity with the portion 17a of the bellows 17 so that it can be readily attached to the bellows 17 by means of induction welding or brazing.

Referring for example to FIG. 8 there is shown an apparatus for magnetically driven arc welding which includes a welding power source 40 which has terminals of opposite polarity connected respectively with the seal ring 16 and an element of the spring 17 which are to be welded together. The apparatus further includes a magnetic driving power source 41 which is connected with a pair of energizing coils 42 and 43 which form when energized loops of magnetic flux as shown by arrows in FIG. 8.

Referring specifically to FIG. 9, welding current flows across the lip 16e on the seal ring 16 and the portion 17a on the bellows 17 as shown by an arrow A while magnetic flux is present as shown by an arrow M. Therefore, the welding arc which is produced between the lip 16e and the portion 17a is subjected to a circumferential force as shown by an arrow F. Thus, the gap between the lip 16e and the portion 17a is spontaneously filled with the welding arc so that the welding can be carried out at once throughout the periphery. The thin lip 16e is found as being effective to improve the mechanical property of the welded area.

Figure 10:
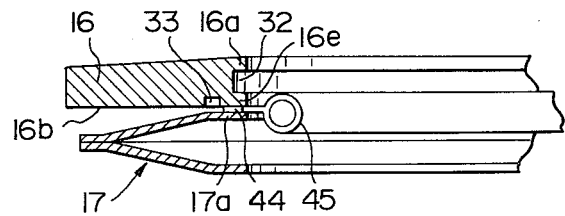
FIG. 10 is a fragmentary sectional view showing a brazing operation using induced heating; and, FIGS. 11 and 12 are fragmentary sectional views showing further embodiments of the present invention.

FIG. 10 shows a brazing operation which may also be employed in the present invention. An annular brazing metal 44 is positioned between the lip 16e of the seal ring 16 and the portion 17a of the bellows 17 and a ring of induction coil 45 is placed radially inside of the brazing area. When the induction coil 45 is energized, the brazing area is immediately heated and the brazing metal is molten. When the brazing area is cooled, the spring 17 is securely attached to the seal ring 16.

It has been found that a preferable result can be obtained with the lip 16e having a radial dimension, that may be defined as a distance between the radially inner edge of the seal ring 16 and the radially inner edge of the recess 33, smaller than one-half of the radial dimension of the seal ring 16 and a thickness smaller than one-half of the thickness of the seal ring 16 as measured at the inner peripheral edge thereof.

Figure 11:
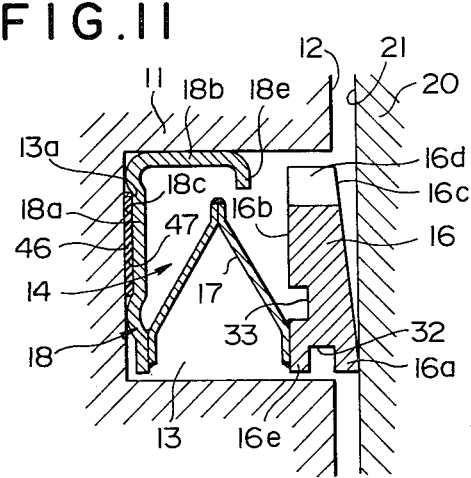

In the embodiment shown in FIG. 11, the annular member 18 is formed at the bottom 18a with a circumferentially extending recess 47 to which an annular gasket 46 is adhesively attached. The gasket 46 is thus positioned between the bottom 18a of the annular member 18 and the bottom 13a of the groove 13. In the embodiment, the recess 47 may be omitted and the gasket 46 may be simply positioned between the bottom 18a of the annular member 18 and the bottom 13a of the groove 13.

Figure 12:
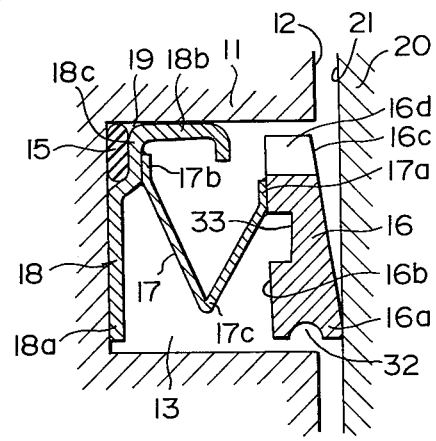

In the embodiment shown in FIG. 12, the annular member 18 has a stepped portion 18c at the corner thereof and the auxiliary seal 15 is positioned in the space 19 provided by the stepped portion 18c. Further, the bellows type spring 17 is of an integral construction and has axial ends 17a and 17b located radially outwards of the intermediate portion 17c. In the embodiment, the recess 33 is provided for decreasing the thermal capacity of the seal ring 16 at the area where the spring 17 is attached. The recess 32 is formed for providing a resiliency to the lip 16a.

The invention has thus been shown and described with reference to specific embodiments, however, it should be noted that the invention is in no way limited to the details of the illustrated structures but changes and modifications may be made without departing from the scope of the appended claims.

I claim:

1. In a rotary piston engine comprising a casing having a pair of opposed inner side surfaces, and a rotor disposed in the casing and having opposite side surfaces confronting with said inner side surfaces of the casing, oil seal means adapted to be positioned in annular seal grooves defined in each of said side surfaces of the rotor including a bottom and a pair of side walls, the improvement wherein said oil seal means comprises:
   seal ring means having lip means adapted to be brought into sliding engagement with the inner side surfaces of the casing,
   bellows-shaped annular spring means having one end secured to the seal ring means,
   annular member means of L-shaped cross-section secured to the other end of the spring means and having bottom and peripheral wall portions seated along the bottom wall and one of the side walls of the seal groove, respectively,
   said peripheral wall portion being positioned behind said seal ring means so that said seal ring means can be brought into abutting engagement with said peripheral wall portion when said annular spring means is collapsed beyond a predetermined distance, and
   auxiliary seal means disposed in said seal groove between said annular member means and a wall of said annular seal groove.

2. The improvement in accordance with claim 1 in which said seal groove includes an auxiliary groove defined in a wall thereof and said auxiliary seal means is positioned in said auxiliary groove.

3. The improvement in accordance with claim 1 in which said annular member means has an oblique corner wall portion formed between the bottom and the peripheral wall portion, and said auxiliary seal means is positioned in a space defined in the seal groove by said oblique corner wall portion.

4. The improvement in accordance with claim 1 in which said peripheral wall portion of the annular member means has at least one radially projecting portion adapted to be engaged by said seal ring means when the spring means is collapsed beyond a predetermined distance.

5. The improvement in accordance with claim 4 in which said seal ring means being formed with at least one cutout provided at a portion corresponding to the projecting portion in the annular member means and defining a space with the projecting portion so that a tool can be inserted through the space for engagement with the projecting portion when the seal means is to be removed from the groove means.

6. The improvement in accordance with claim 1 in which said auxiliary seal means is a gasket attached to the bottom of the annular member means so as to be placed between the annular member means and the bottom wall of the seal groove.

7. The improvement in accordance with claim 1 in which said peripheral wall portion is formed with at least one cutout so as to provide radial flexibility.

8. The improvement in accordance with claim 1 in which said seal ring means is formed with recess means behind said lip means so as to provide the lip means with resiliency.

9. The improvement in accordance with claim 1 in which said seal ring means is provided with thin portion for attachment with said one end of the spring means, said thin portion having thermal capacity compatible with that of the spring means.

* * * * *